(12) United States Patent
Boon

(10) Patent No.: US 7,419,137 B2
(45) Date of Patent: Sep. 2, 2008

(54) CABLE HANDLING APPARATUS

(75) Inventor: Ian Charles Boon, Parkdale (AU)

(73) Assignee: IB Supplies PTY Ltd., Parkdale (AU)

( * ) Notice: Subject to any disclaimer, the term of this patent is extended or adjusted under 35 U.S.C. 154(b) by 156 days.

(21) Appl. No.: 10/572,767

(22) PCT Filed: Sep. 13, 2004

(86) PCT No.: PCT/AU2004/001227

§ 371 (c)(1),
(2), (4) Date: Mar. 21, 2006

(87) PCT Pub. No.: WO2005/031934

PCT Pub. Date: Apr. 7, 2005

(65) Prior Publication Data

US 2007/0119997 A1    May 31, 2007

(30) Foreign Application Priority Data

Sep. 30, 2003    (AU)    ............................ 2003905304

(51) Int. Cl.
*B66D 1/00* (2006.01)
*B65H 27/00* (2006.01)
(52) U.S. Cl. .................. 254/323; 254/389; 242/397.3; 242/615.1

(58) Field of Classification Search ................. 254/323, 254/326, 362, 389; 242/397.3, 615.1–615.3
See application file for complete search history.

(56) References Cited

U.S. PATENT DOCUMENTS

| 1,935,585 | A |   | 11/1933 | Tornblom |
|---|---|---|---|---|
| 2,941,746 | A |   | 6/1960 | Hunt |
| 3,309,066 | A | * | 3/1967 | Carlson et al. ............... 254/268 |
| 3,531,059 | A |   | 9/1970 | Walker |
| 4,108,264 | A |   | 8/1978 | Tanaka |
| 4,666,102 | A |   | 5/1987 | Colbaugh et al. |
| 4,767,073 | A | * | 8/1988 | Malzacher ................. 242/414 |
| 5,330,122 | A |   | 7/1994 | Wood |
| 5,765,782 | A | * | 6/1998 | De Vettor .................... 242/403 |

FOREIGN PATENT DOCUMENTS

| GB | 2 156 393 | 10/1985 |
|---|---|---|
| WO | WO 02/06146 | 1/2002 |

* cited by examiner

*Primary Examiner*—Evan H Langdon
(74) *Attorney, Agent, or Firm*—Volpe and Koenig, P.C.

(57) ABSTRACT

A feed control assembly for feeding a cable on to a rotatable reel has a primary guide for controlling the location of the cable as it feeds on to the reel, and a drive assembly arranged to reciprocate the primary guide means as the cable feeds through the primary guide.

5 Claims, 11 Drawing Sheets

CABLE HANDLING APPARATUS

FIELD OF THE INVENTION

This invention relates to a cable handling apparatus. In a particular non-limiting aspect it relates to a vehicle which can lay optic fibre cable from a rotating cable reel as the vehicle travels along the ground, or across water or in the case of an aircraft such as a helicopter as it travels through the air.

BACKGROUND OF THE INVENTION

In wartime situations, commanders need to have effective and instantaneous communication with their fellow commanders over the battle field. Of course, an important element of such communication is that it should not be prone to being intercepted by the enemy.

Clearly, radio waves can be readily intercepted and depending upon the sophistication of the enemy's code cracking procedures may in some instances be deciphered by the enemy It is possible to dramatically reduce the likelihood of interception by laying cable such as fibre optic cable to carry the communications. However, as the cable must be laid on the battlefield, the actual act of laying the cable can be quite hazardous. Thus, to reduce the risks involved with cable laying and retrieval, the method of laying the cable should be one which is rapid and efficient, thereby reducing the amount of time personnel laying the cable are exposed to the battlefield hazards.

Thus, this invention seeks to provide cable handling apparatus which can assist in rapid cable laying and/or cable retrieval operations.

DISCLOSURE OF THE INVENTION

The invention provides in one aspect a feed control assembly for feeding a cable on to a rotatable reel comprising,
  primary guide means for controlling the location of the cable as it feeds on to the reel, and
  a drive assembly arranged to reciprocate the primary guide means as the cable feeds through the primary guide means.

The drive assembly may comprise a rotary member. The rotary member may comprise a belt or chain. The belt or chain may be driven by a sprocket or pulley arrangement.

The primary guide means may comprise a guide supported by a guide mount.

The belt or chain may be connected via the guide mount to the guide. It may be connected by way of a pin to the guide mount. The pin may be slidable in a slot provided in the guide mount.

In turn, the guide mount may be slidable along a transverse member. The transverse member may comprise a drive housing for the belt or chain.

The feed control assembly may be mounted on a vehicle. It may be mounted at the rear of the vehicle.

Similarly, the rotatable wheel may be mounted on the rear of the vehicle and arranged so that cable from the reel may feed through the guide.

Drive means may be provided for rotating the reel. The drive means may be hydraulically driven. The drive means may also operate to reciprocate the primary guide means. They may reciprocate the drive by driving through the sprockets and chain to move the pin and hence reciprocate the primary guide means.

The chain or belt may be driven via an intermediate chain or belt. The intermediate chain or belt may also be housed in the drive housing.

In one particular form of the invention, the feed control assembly, rotatable reel and drive means may comprise a discrete assembly which can be loaded as a unit onto the back of a vehicle as required. The discrete unit may include own fuel supply and/or battery for the drive means. It may include "umbilical" wiring which is connected to a control unit. The control unit may then be placed in the cab of a vehicle or a helicopter.

Suitably, the feed control assembly may be associated with means for controlling the rate of rotation of the rotatable reel. It may also include means for varying the direction of rotation of the reel. It may also allow the reel to be free spinning or braked.

Viewing means for displaying the functioning of the reel to an operator may be provided. The viewing means may be provided in the cab of a vehicle. They may comprise an electronic monitor camera connected to an electronic viewing screen for displaying images from the monitor camera.

Preferred aspects of the invention will now described with reference to the accompanying drawings.

Figure 1:
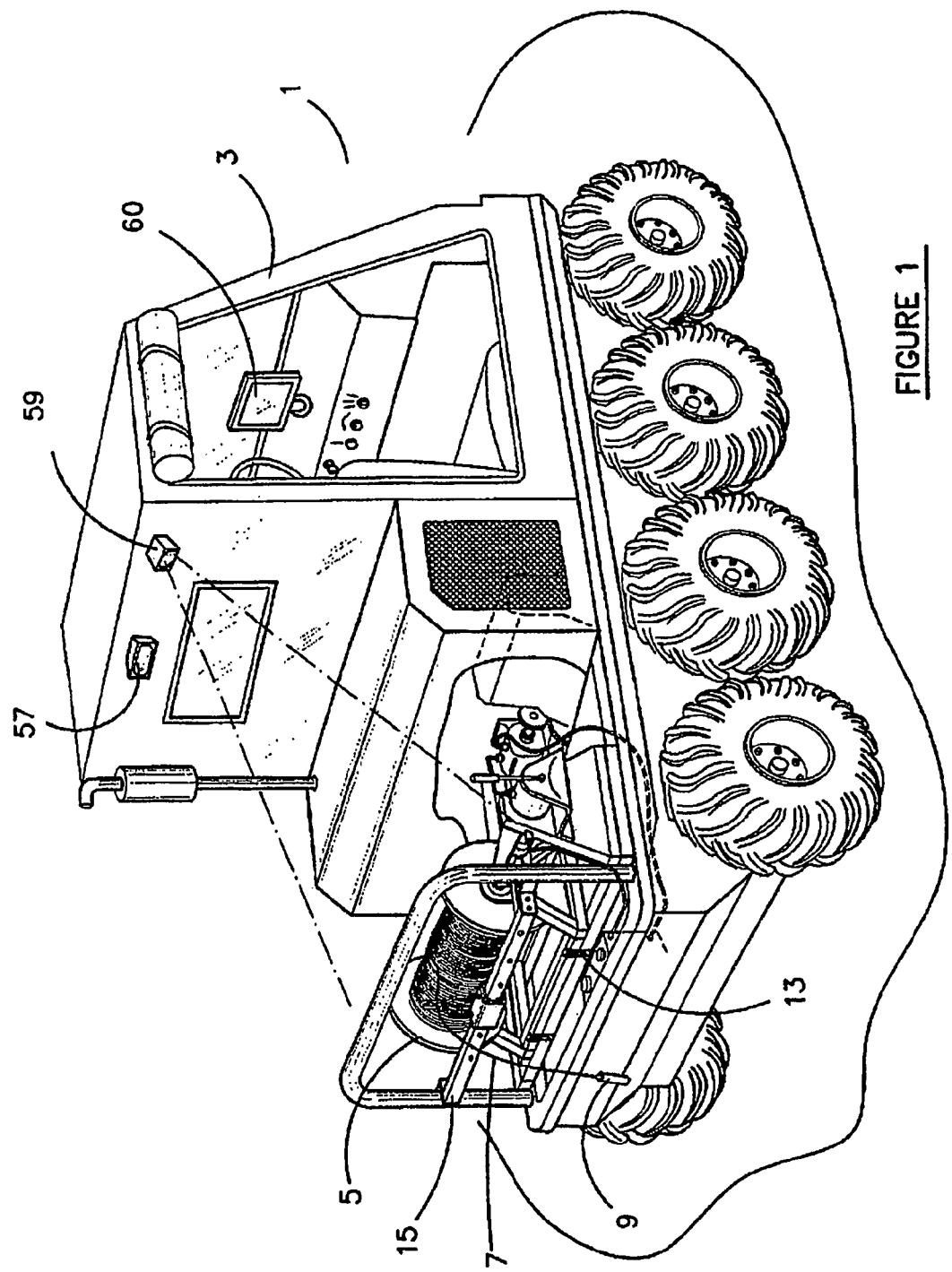
FIG. 1 shows an isometric of a vehicle including a feed control assembly according to the invention.
Figure 2:
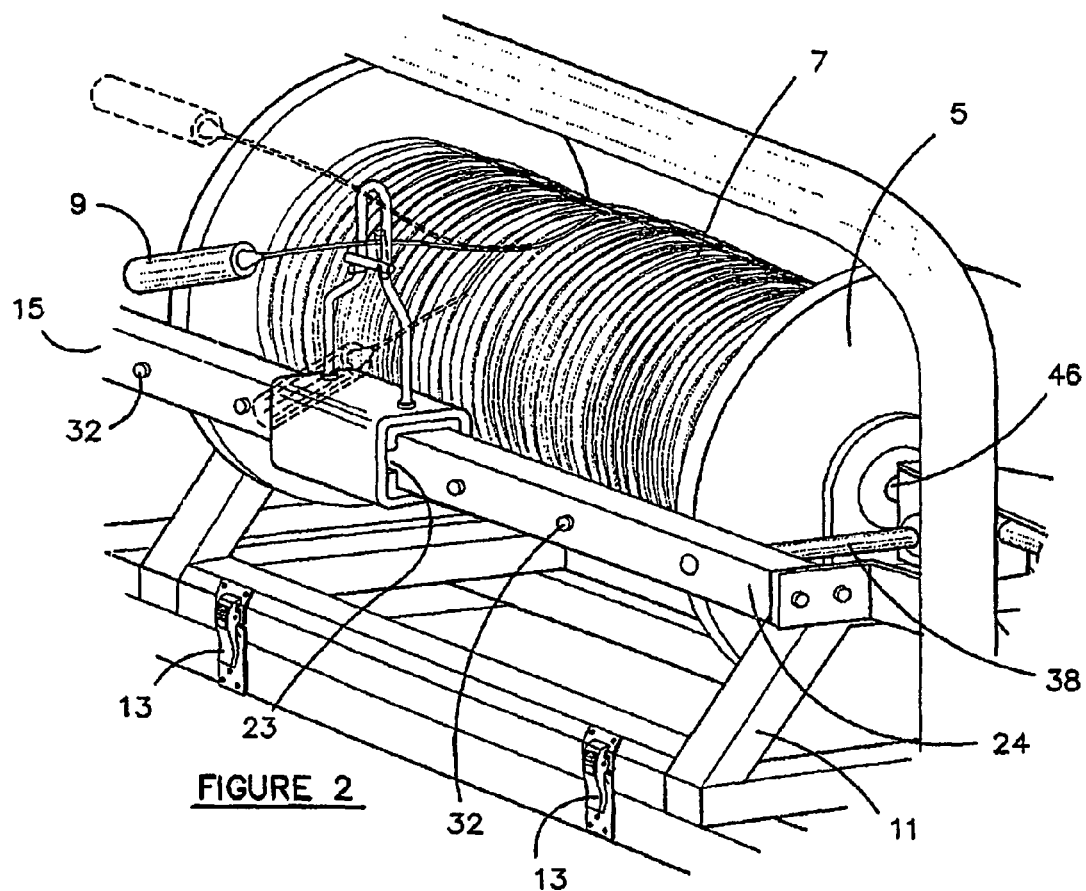
FIG. 2 shows a fragmentary enlarged view of the feed control assembly and cable reel of FIG. 1.
Figure 3:
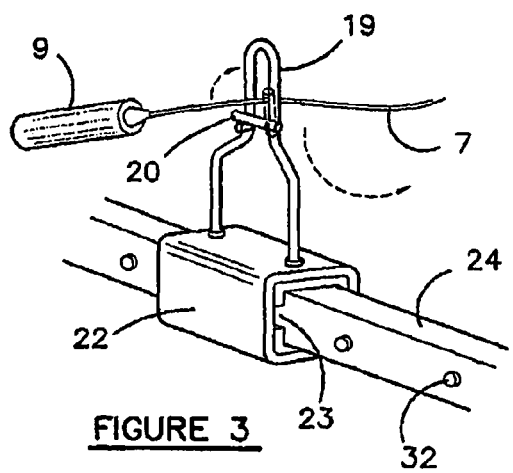
FIG. 3 shows a fragmentary enlarged view of the feed control assembly of FIG. 1.
Figure 4:
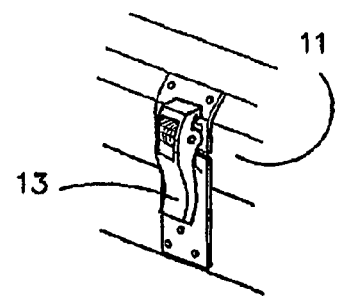
FIG. 4 shows an enlarged view of a clip for securing the reel to a vehicle.

The various elements identified by numerals in the drawings are listed in the following integer list.

| | Integer List |
|---|---|
| 1 | Cable handling vehicle |
| 3 | Cab |

-continued

| | Integer List | |
|---|---|---|
| 5 | Reel | |
| 7 | Cable (fibre optic or other cable) | |
| 9 | Connector | |
| 11 | Mounting assembly | |
| 13 | Clips | |
| 15 | Feed control assembly | |
| 17 | Mounting bar | |
| 19 | Guide | |
| 20 | Latch | |
| 22 | Guide mount | |
| 23 | Recess | |
| 24 | Drive housing | |
| 26 | Mounting legs | |
| 28 | Chain | |
| 29 | Sprocket | |
| 30 | Sprocket | |
| 31 | Spacer bar | |
| 32 | Bolt | |
| 33 | Pin | |
| 35 | Slot | |
| 36 | Sprocket | |
| 37 | Drive chain | |
| 38 | Drive shaft | |
| 40 | Hydraulic motor | |
| 42 | Coupling | |
| 44 | Gearbox | |
| 46 | Drive shaft | |
| 48 | Control lever | |
| 50 | Gear pump | |
| 51 | Hydraulic fluid line | |
| 52 | Hydraulic fluid line | |
| 54 | Tank | |
| 55 | Return line | |
| 57 | Light | |
| 60 | Video screen | |
| 62 | On-off switch | |
| 64 | Potentiometer (pressure) | |
| 66 | Electric joystick | |
| 68 | Strainer | |
| 69 | fluid line | |
| 70 | Engine | |
| 71 | Coupling | |
| 77 | Pressure gauge | |
| 79 | Pressure relief valve | |
| 80 | Return line | |
| 81 | Filter | |
| 83 | Flow control cartridge assembly | |
| 85 | Double solenoid valve | |
| 87 | Crossline relief valve | |
| 89 | Filter | |
| 100 | Cable handling vehicle | |
| 103 | Cab | |
| 104 | Tray | |
| 105 | Reel | |
| 107 | Cable | |
| 109 | Connector | |
| 111 | Mounting assembly | |
| 116 | Module | |
| 119 | Primary guide | |
| 122 | Guide mount | |
| 123 | Slot | |
| 124 | Housing | |
| 125 | Rolling ring drive | |
| 127 | Cover | |
| 129 | Shaft | |
| 130 | Bearing | |
| 131 | Release lever | |
| 133 | Switch mechanism | |
| 134 | Stop | |
| 135 | Control lever | |
| 137 | Pitch calibration | |
| 139 | Stabiliser bai | |
| 140 | Guide wheel | |
| 142 | Hydraulic motor | |
| 144 | Chain drive | |
| 145 | Cover | |
| 146 | Fluid line | |

-continued

| | Integer List | |
|---|---|---|
| 147 | Gear pump | |
| 148 | Secondary guide | |
| 149 | Slot | |
| 150 | Remote control socket | |
| 151 | Controller | |

Referring to FIG. 1 of the accompanying drawings, there is shown a cable handling vehicle generally designated 1 with a cab 3.

A rotatable reel 5 for fibre optic cable 7 is mounted on the rear of the cable handling vehicle via the mounting assembly 11. Clips 13 are used to secure the mounting assembly and hence reel 5 to the vehicle.

The fibre optic cable 7 is provided with a connector 9 which protrudes from the rear of the vehicle beyond the feed control assembly also mounted on the rear of the vehicle.

Referring to FIGS. 2 to 7, it can be seen that the feed control assembly 15 is mounted on the rear of the vehicle via the mounting bar 17.

It includes a guide 19 with a narrow upper portion and a broader lower portion. A latch 20 is arranged to be opened and closed so that the connector 9 may be fed through the lower portion initially after which the latch is closed so as to ensure that the cable runs through the upper portion of the guide. As the upper portion of the guide is of narrower width than the connector 9, closing of the latch ensures that the cable 7 does not accidentally slip out of the guide.

The guide is mounted on the guide mount 22 which is slidable on the drive housing 24.

As there are a number of bolts 32 protruding from one side of the drive housing a recess 23 is provided in the internal profile of one side of the guide mount to allow the guide mount to slide past the bolts.

Mounting legs 26 are provided on either side of the drive housing and these in turn are used to mount the feed control assembly generally designated 15 on the mounting bar 17.

Figure 5:
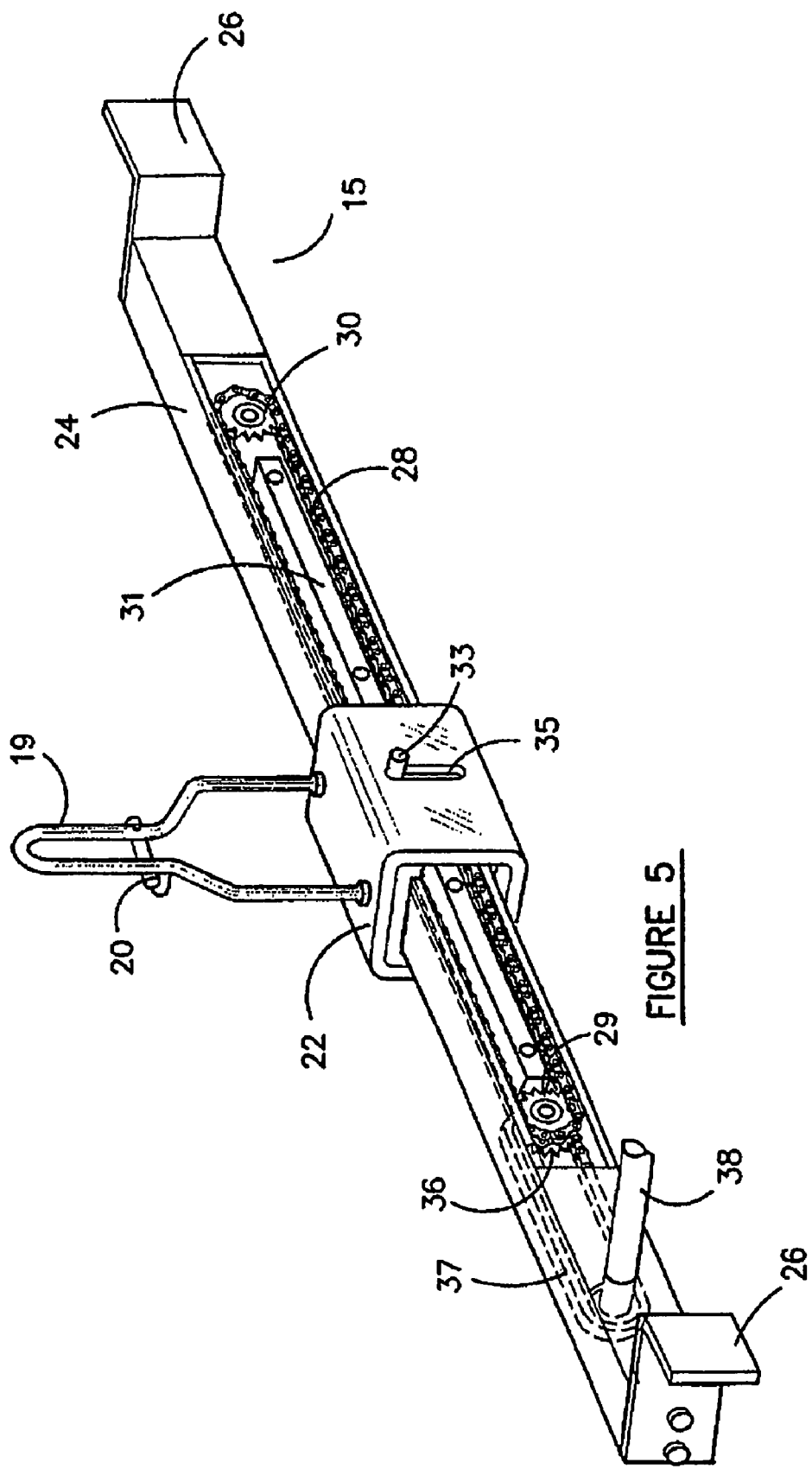
FIG. 5 shows an isometric view of the rear of the feed control assembly shown in the earlier drawings.
Figure 6:
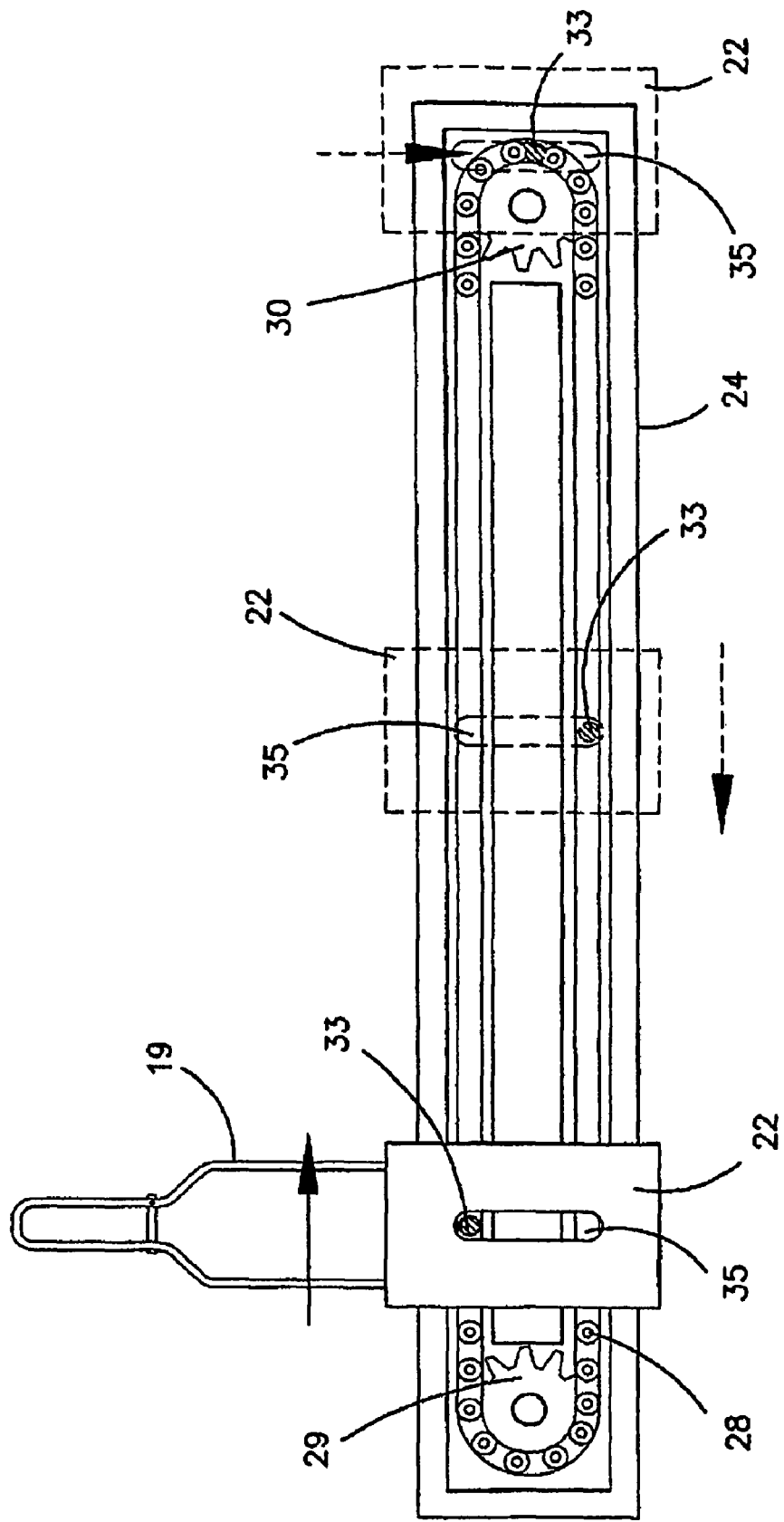
FIG. 6 shows a plan view of a section of the feed control assembly of FIG. 5 in various configurations.

As can be seen more clearly in FIGS. 5 and 6, the feed control assembly includes a chain 28 for rotation about the sprockets 29 and 30. Sprocket 29 acts as the drive sprocket and sprocket 30 acts as an idler sprocket. A spacer bar 31 is held in the housing between the opposed sides of the chain by the bolts 32. The spacer bar may typically comprise a low friction plastics material such as Teflon.

The chain 28 is driven by a drive chain 37 arranged to drive the sprocket 36. Power for the drive chain is provided through the drive shaft 38 and associated sprocket.

A pin 33 is mounted on the chain 28 and extends through a slot 35 provided on one side of the guide mount 22.

Thus, it can be seen that the pin moves with the chain 28 causing the guide mount to reciprocate along the length of the drive housing 24. As a result cable can be evenly wound across the width of the reel 5 as the vehicle is being reversed to retrieve the cable.

Figure 7:
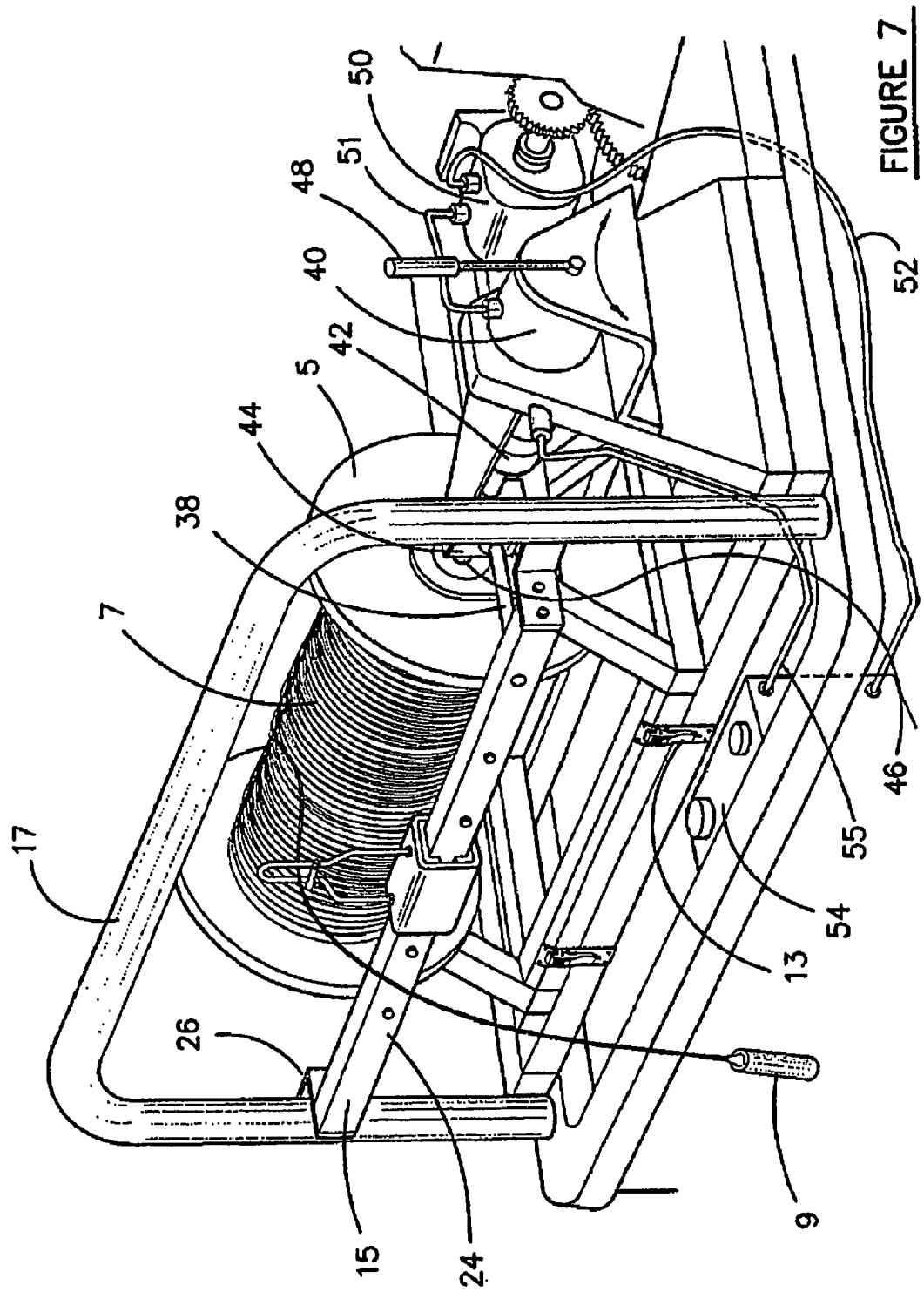
FIG. 7 shows a fragmentary isometric view of the feed control assembly and associated hydraulic drive mechanisms.

Referring to FIG. 7, drive power for the feed control assembly 15 and reel 5 is provided by the hydraulic motor 40.

The hydraulic motor acts through the coupling 42 and gearbox 44 to direct power for turning the reel through drive shaft 46. Drive shaft 38 from the same gearbox provides power for the feed control assembly.

Figure 8:
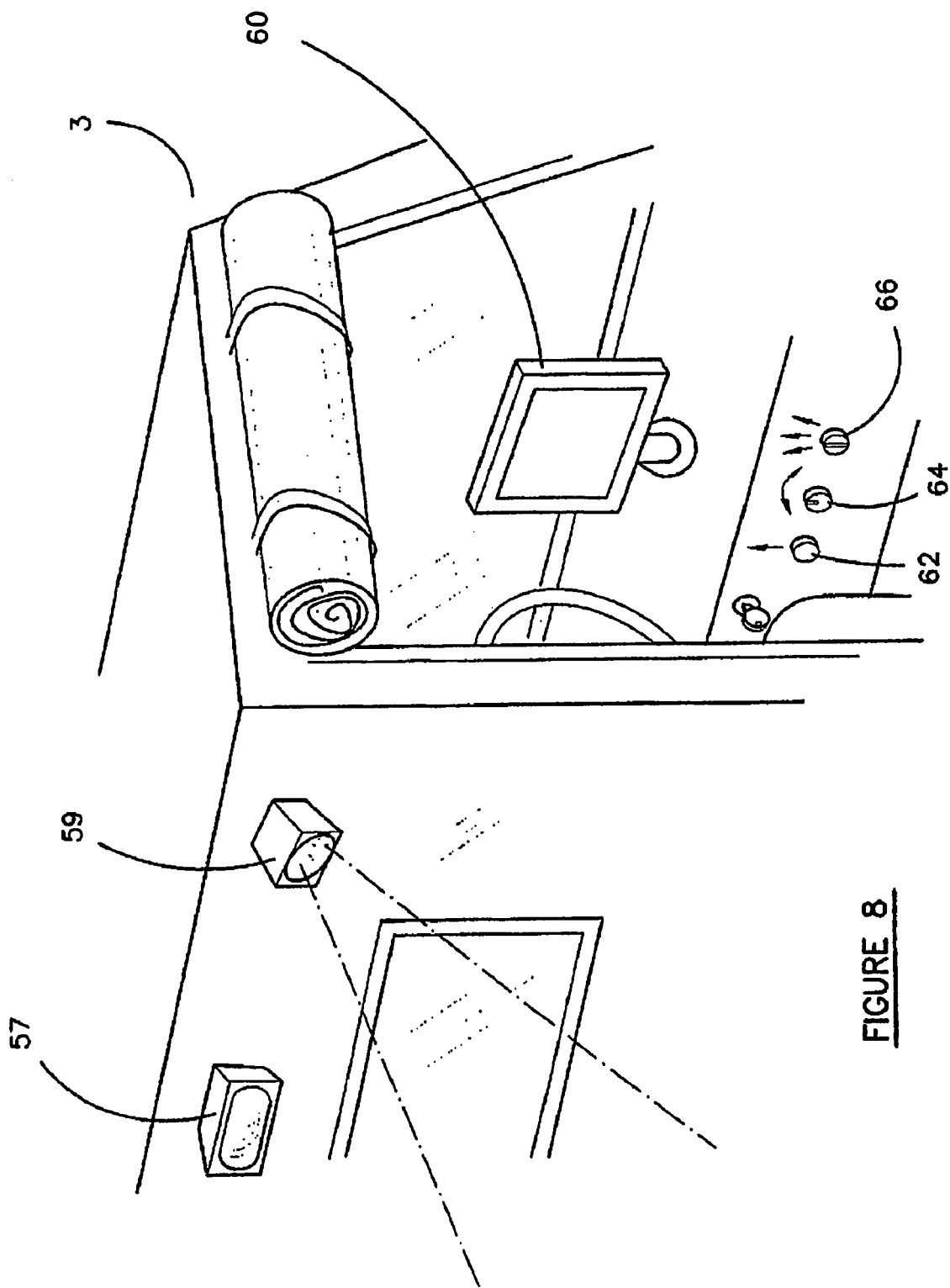
FIG. 8 shows a fragmentary isometric view of the vehicle cab.

Operation of the hydraulic motor is externally controlled by the control lever 48 and/or by the controls in the cab shown more clearly in FIG. 8. The controls in the cab comprise the on-off switch 62, potentiometer 64 and electric joystick 66. The operation of these will be described in more detail hereinafter.

Figure 9:
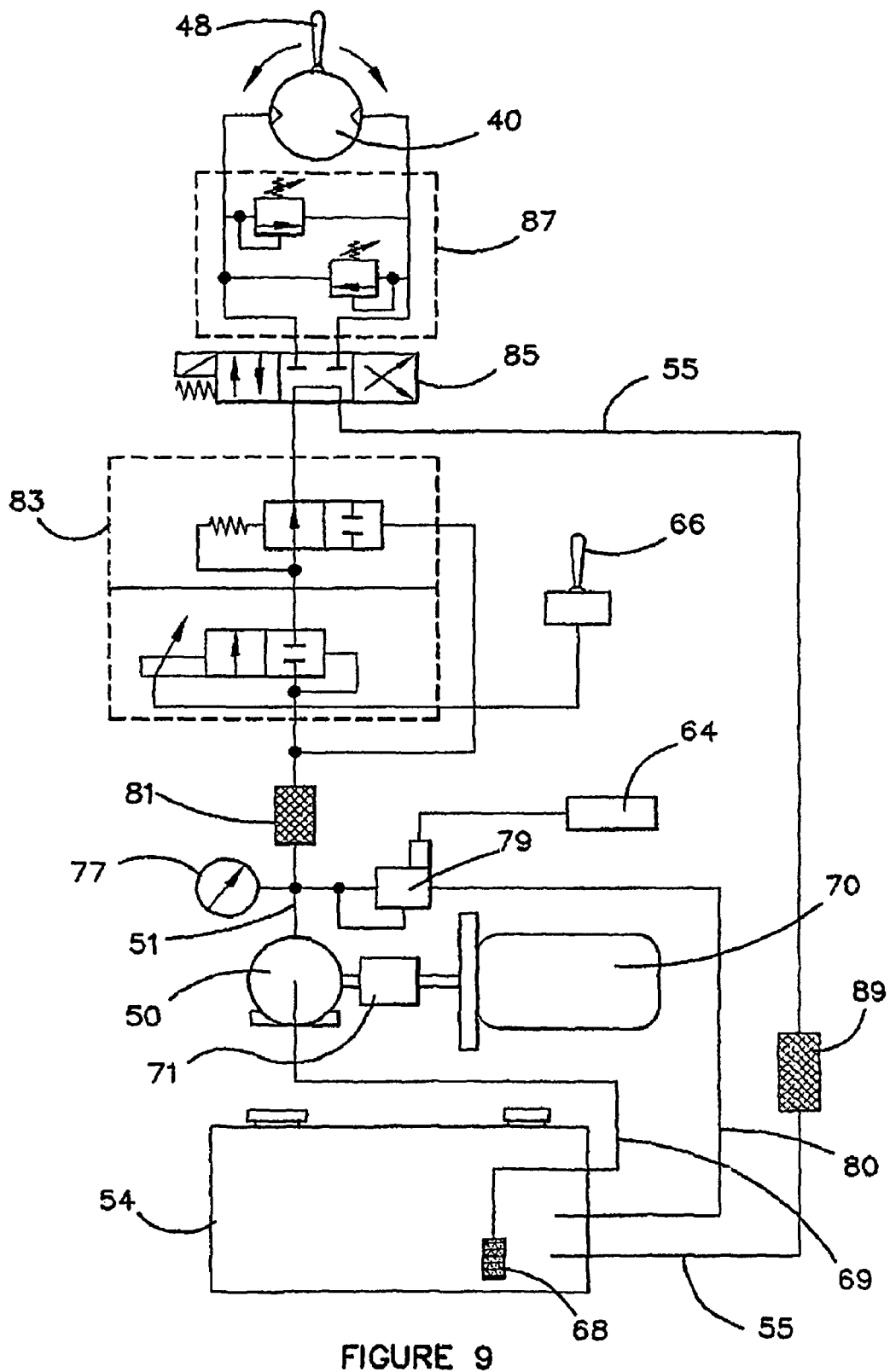
FIG. 9 shows a hydraulic circuit for controlling the feed control assembly.

Referring to FIG. 9, the drive and control arrangement for the operation of the reel and feed control assembly comprises an engine 70 connected via a coupling 71 to a gear pump 50. The gear pump obtains hydraulic fluid from the tank 54 mounted on the rear of the vehicle via the fluid line 69 after being strained by the strainer 68.

Hydraulic fluid under pressure is fed via the hydraulic fluid line 51 from the gear pump and pressure in this line is displayed by the pressure gauge 77. A pressure relief valve 79 connected to the fluid line 51 and controlled by the potentiometer 64 is used to adjust the pressure in line 51 to a desired level for operating the apparatus.

A return line 80 for returning hydraulic fluid from the pressure relief valve to the tank 54 is provided for recycling excess hydraulic fluid. A filter 81 is provided downstream of the pressure relief valve to filter fluid prior to entry of the hydraulic fluid into the fluid control cartridge assembly 83.

The fluid control cartridge assembly is controlled by the electric joystick 66. This sets the flow rate of the hydraulic fluid and hence the ultimate speed of the hydraulic motor 40 driving the apparatus.

A double solenoid valve 85 operating through the cross line relief valve 87 controls the direction of rotation of the motor 40 or allows freewheeling of the motor by disconnecting the hydraulic fluid flow completely. Operation of the double solenoid valve is via the control lever 48.

Thus, it can be seen that the control circuit allows the hydraulic motor to be driven in either direction. Thus it is possible to lay down or take up cable at speeds controlled according to the setting of the electric joystick 66. Alternatively, it can be allowed to freewheel by complete disconnection of the motor.

Referring to FIG. 9, it can be seen that the cab includes an on-off switch 62 for controlling the pump 50 and also includes the potentiometer 64 and electric joysticks 66 on the dash to allow control of the cable laying apparatus from within the cab.

The cab also includes a video screen 60 for displaying images from the electronic monitor 59 mounted on the exterior rear of the cab.

A light 57 is also provided to illuminate the cable and feed control assembly so that it can be viewed while cable laying at night. Alternatively or additionally the electronic monitor camera 59 may have night vision capability.

Figure 10:
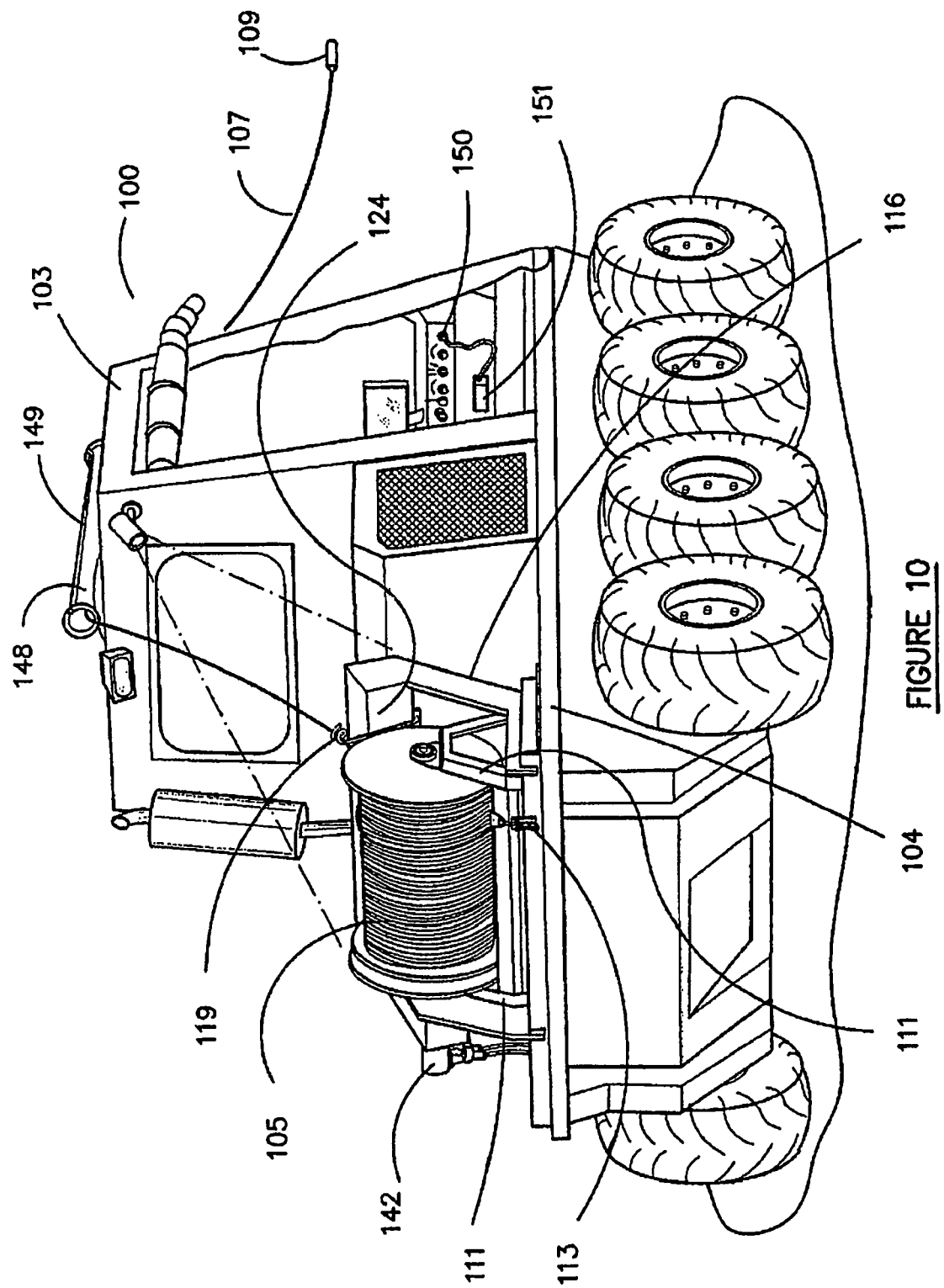
FIG. 10 shows an isometric view of a vehicle including an alternative form of feed control assembly according to the invention.
Figure 11:
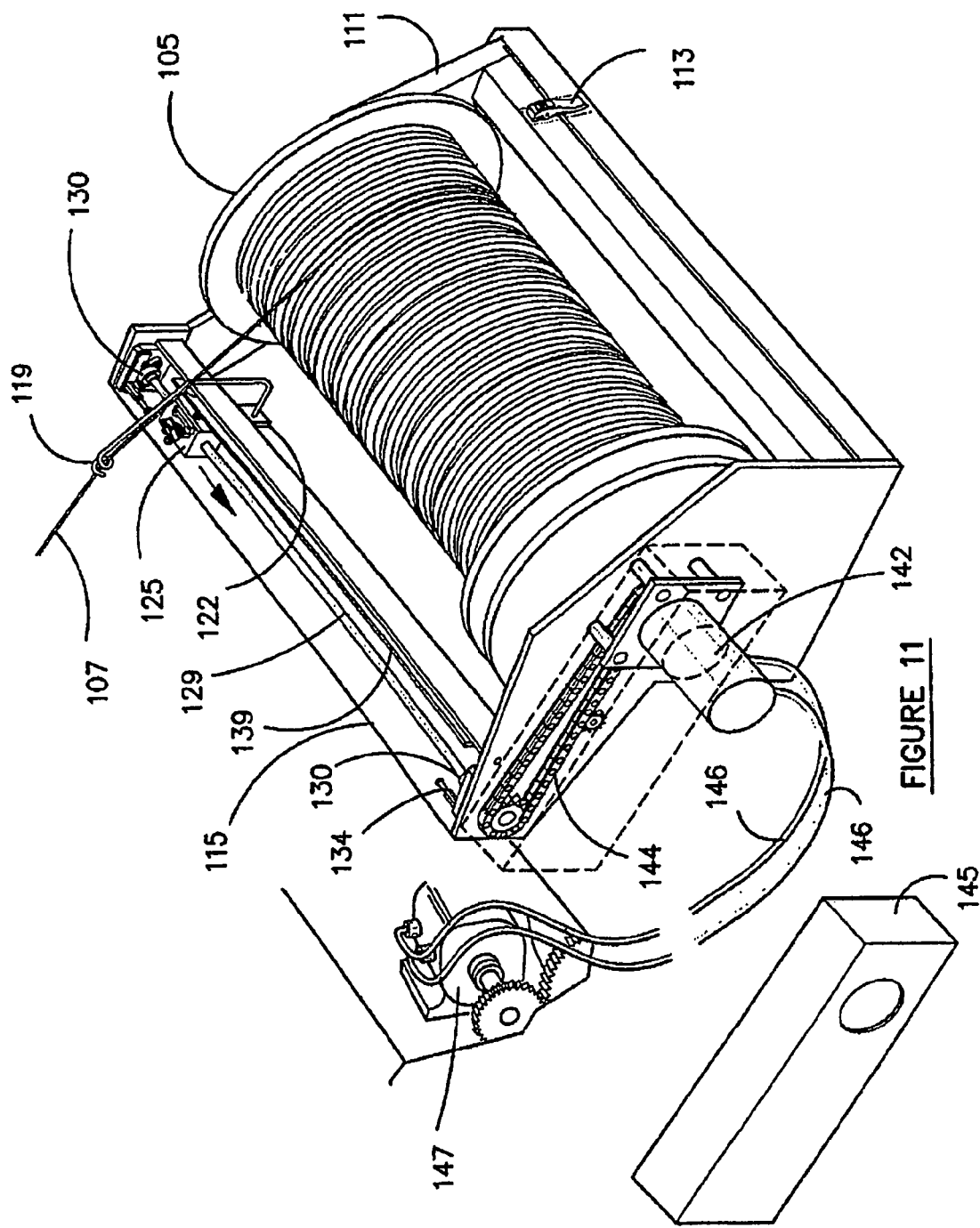
FIG. 11 shows an enlarged isometric view of a module incorporating the feed control assembly.
Figure 12:
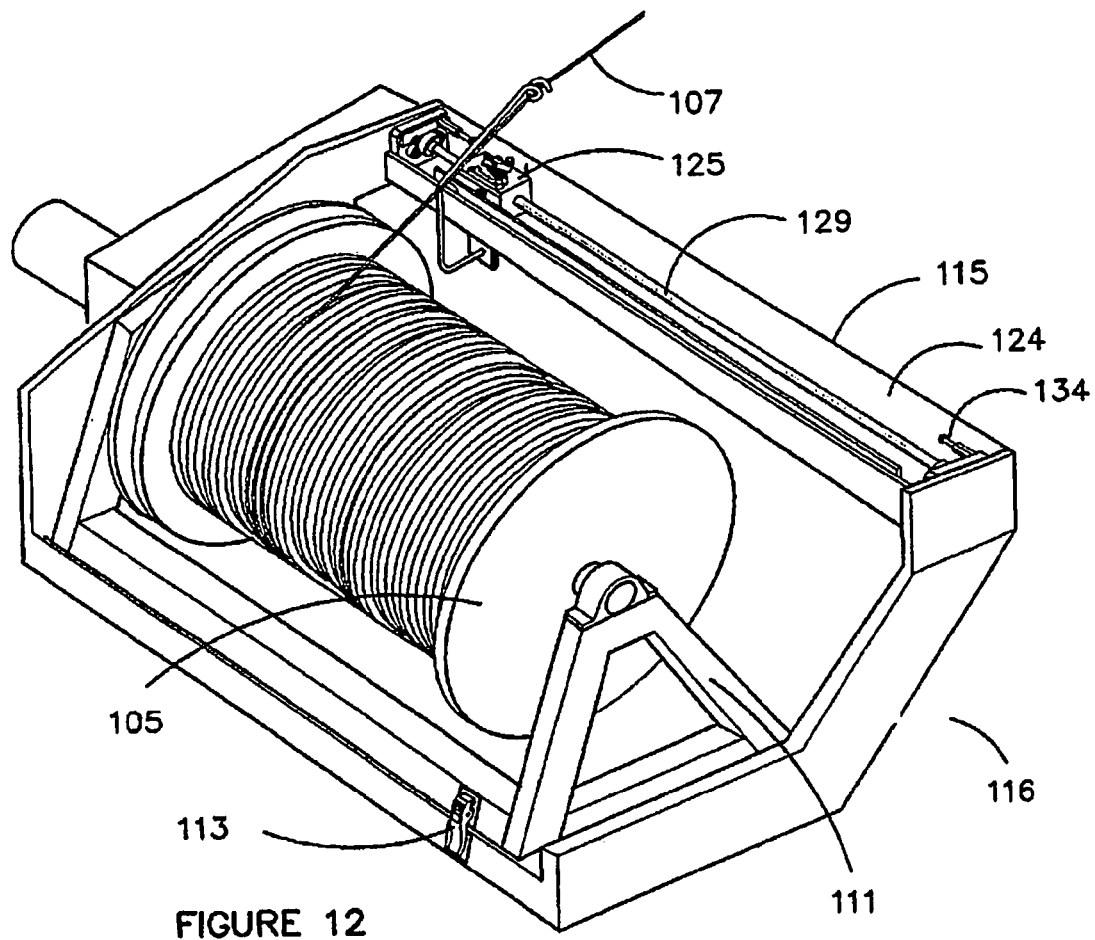
FIG. 12 shows an isometric view of the module of FIG. 11 taken from the opposite side.
Figure 13:
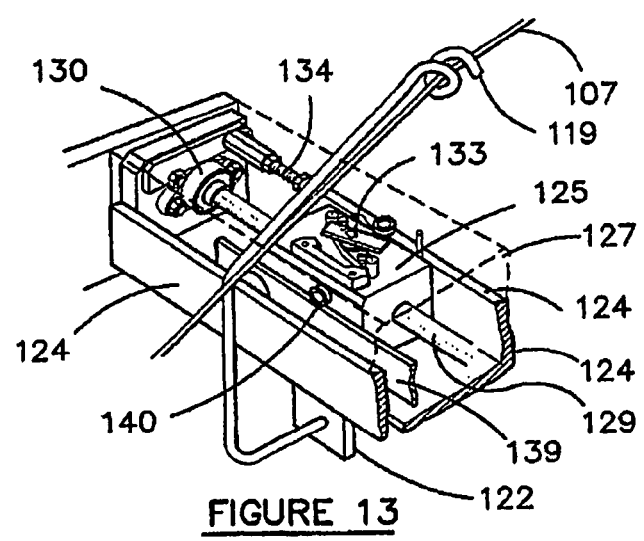
FIG. 13 shows an enlarged cut away view of the feed control assembly according to the invention.
Figure 14:
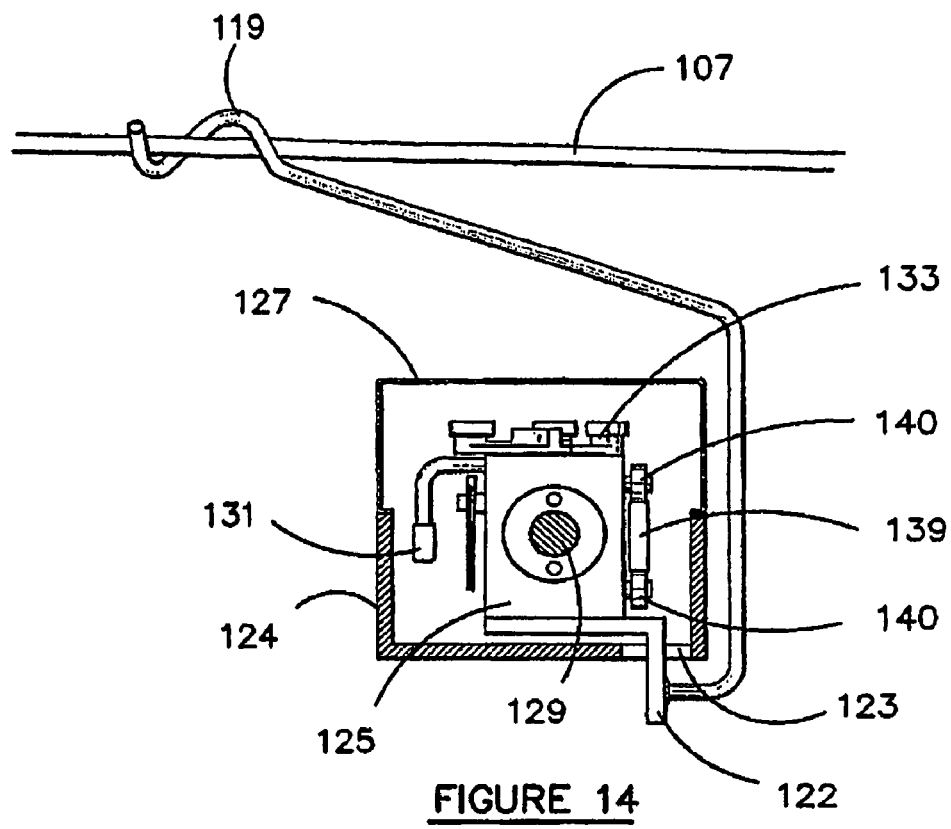
FIG. 14 shows a cross section taken through the feed control assembly shown in FIG. 13.
Figure 15:
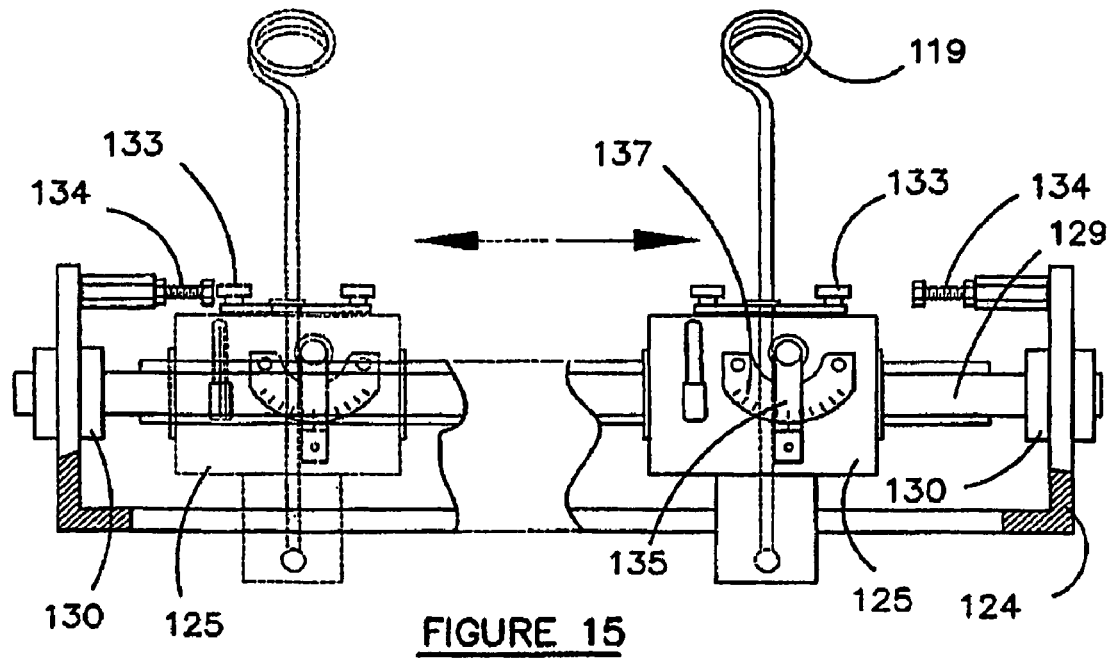
FIG. 15 shows a partially cut away underneath plan view of two different configurations of the feed control assembly.

Referring to FIG. 10, there is shown a cable handling vehicle 100 with a cab 103 and a tray 104 at the rear of the cab.

The tray provides support for a removable module 116 incorporating the feed control assembly 115 according to the invention.

In addition to the feed control assembly 115, the module includes a reel 105 rotatably mounted on the mounting assembly 111 and a clip 113 is used to secure the module 116 to the tray.

The module also includes a hydraulic motor 142 for rotating the reel 105 in order to take up or lay down cable 107. The cable is provided with a connector 109.

The controls in the cab are essentially the same as those already described with respect to FIGS. 1 to 9 with the exception that there is an additional remote control socket 150 in the dashboard. A controller 151 may be connected through the remote control socket so that a person may be walking alongside the vehicle whilst controlling it via the controller 151.

Referring to FIGS. 11 to 15, the feed control assembly 115 includes a primary guide 119 for feeding the cable 107 onto the reel. The primary guide is arranged so that it feeds cable onto the reel as the vehicle moves forward. Thus, the secondary guide 148 including the elongate slot 149 through which the cable may be fitted into the secondary guide is provided on the roof of the cab to guide the cable into the primary guide 119 and thence onto the reel as is shown more clearly in FIG. 10.

It is to be appreciated that the guides are not used when the vehicle is laying down cable as the cable simply feeds away from the back of the vehicle as it moves forward without requiring any guide as it unwinds from the reel.

The primary guide is mounted on the guide mount 122 attached to the rolling ring drive 125. The guide mount is secured to and extends from the rolling ring drive through the slot 123 formed in the bottom of the housing 124 of the feed control assembly. The housing includes a removable cover 127 for allowing access to the components of the feed control assembly.

The rolling ring drive is a commercially available Whing rolling ring drive which operates on the basis that it includes a number of rolling ring members telescoping the shaft 129. The shaft is mounted through bearings 130 provided on either side of the housing. The ring members are arranged so that their axis is at an angle to the axis of rotation of the shaft 129. The frictional engagement between the shaft and ring members causes the assembly of ring members comprising the drive to be driven by the shaft. The rate and direction of travel of the rolling ring drive can be set by setting the angle of the axis of the rings with respect to the axis of rotation of the shaft.

The rolling ring drive includes a release lever 131 for disengaging the drive from the shaft 129 and a switch mechanism 133 for varying the actual angles of the axes of the rings in the drive so as to reverse the direction of the drive when the switch mechanism comes into contact with a stop 134 at each end of the housing.

A control lever 135 is provided on the base of the rolling ring drive for the purposes of changing the pitch or angle of the rolling rings and hence the rate of movement of the drive per rotation of the shaft. The pitch calibration 137 is provided in association with the control lever to enable accurate control of the angle of the ring axes.

A stabiliser bar 139 runs parallel to the shaft 129. Thus, the pair of guide wheels 140 running along the top and bottom of the stabiliser bar serve to stabilise the rolling ring drive against rotation as the rolling ring drive reciprocates along the rotating shaft.

The hydraulic motor 142 provided on the module 116 is fed by hydraulic fluid lines 146 from a gear pump 147 provided immediately behind the cab of the vehicle. The hydraulic motor directly drives the reel 105 through a central shaft and also drives the shaft 129 via the chain drive 144. A cover 145 fits over the chain drive.

Thus it can be seen that the form of invention shown with reference to FIGS. 10 to 15 has a particular advantage in that the operator can directly watch the cable feeding onto the vehicle as the vehicle moves forward. The arrangement of the video camera and screen can give him a good view of the cable unwinding at the back of the vehicle when he is laying down cable.

The arrangement of hydraulic controls for controlling the operation of cable laying and rewinding is substantially the same as that disclosed with reference to FIG. 9 in relation to the fist embodiment of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

The invention claimed is:

1. A cable laying vehicle for feeding cable on and off of a rotatable reel as the vehicle travels along the ground, comprising:
    a driver's cab;
    a tray behind the driver's cab;
    a module removably mounted on the tray;
    a cable return guide arranged to guide the cable over the cab;
    wherein the module comprises:
    a mounting assembly for a rotatable shaft;
    a rotatable reel offset from the rotatable shaft;
    a rolling ring drive mounted on the rotatable shaft for reciprocation along the length of the shaft;
    a switch on the rolling ring drive set to reverse the direction of travel of the rolling ring drive along the rotatable shaft when it reaches a stop provided proximate each end of the rotatable shaft;
    primary guide means mounted on the rolling ring drive arranged to direct cable passing through the cable return guide onto the rotatable reel;
    a stabilizer assembly for preventing the rolling ring drive from rotating with the rotatable shaft; and
    a pitch control for setting the length of travel of the rolling ring drive along the rotatable shaft per rotation of the shaft.

2. The cable laying vehicle according to claim 1 wherein the stabilizer assembly comprises a stabilizing bar extending generally parallel to the axis of rotation of the rotatable shaft and a pair of guide wheels connected to the rolling ring drive the guide wheels being arranged to travel lengthwise across top and bottom surfaces of the stabilizing bar.

3. The cable laying vehicle according to claim 1 wherein the module comprises a motor arranged to drive the rotatable reel and the rotatable shaft.

4. The cable laying vehicle according to claim 3 wherein the motor is a hydraulic motor powered through hydraulic fluid lines from a gear pump provided on the tray between the driver's cab and module, the hydraulic motor being arranged to directly drive the rotatable reel through a central shaft which is connected by chain drive to drive the rotatable shaft.

5. The cable laying vehicle according to claim 1 comprising a video camera arranged to provide the driver of the vehicle with a view of the cable unwinding at the back of the vehicle through a screen provided in the cab.

* * * * *